United States Patent [19]

Hultmark

[11] Patent Number: 4,779,610
[45] Date of Patent: Oct. 25, 1988

[54] PLANE SOLAR HEAT COLLECTOR

[76] Inventor: Göran Hultmark, S-421 76, Västra Frölunda, Sweden

[21] Appl. No.: 60,890

[22] Filed: Jun. 12, 1987

Related U.S. Application Data

[63] Continuation-in-part of Ser. No. 817,861, Dec. 10, 1985, abandoned.

[30] Foreign Application Priority Data

Mar. 14, 1984 [SE] Sweden .............................. 8401416

[51] Int. Cl.$^4$ .............................................. F24J 2/30
[52] U.S. Cl. .................................... 126/435; 126/437; 126/444
[58] Field of Search ................ 126/434, 437, 444, 435

[56] References Cited

U.S. PATENT DOCUMENTS

| | | | |
|---|---|---|---|
| 2,595,905 | 5/1952 | Telkes | 126/435 |
| 4,127,104 | 11/1978 | Greene | 126/400 |
| 4,239,032 | 12/1980 | Irving | . |
| 4,355,629 | 10/1982 | Cornell | 126/437 |
| 4,365,615 | 12/1982 | Melvin | 126/437 |
| 4,407,268 | 10/1983 | Jardin | 126/437 |

OTHER PUBLICATIONS

"Sun Power", J. C. McVeigh, 6/1977, pp. 28–29, pp. 36–37.
"Solar Energy Technology Handbook", Part A, Engineering Fundamentals, 7/1980, pp. 227–228.
"Solar Energy Conversion", Edited Dixon & Leslie, 1979, pp. 158–161.
"Energie Solaire", 5/1978, pp. 34, 60, 83, 149, 164, 172.

Primary Examiner—Carroll B. Dority, Jr.
Attorney, Agent, or Firm—Cushman, Darby & Cushman

[57] ABSTRACT

A solar accumulator with a plane solar heat collector of the kind which emits radiated heat to an accumulator tank containing a heating fluid in a pressure free condition and at least one heat exchanger coil is arranged in said accumulator tank. The collector comprises an external transparent covering means for the incident radiation disposed at a selected distance from a radiation absorbent surface, which comprises one wall of the accumulator tank comprising a material having a good thermal conductivity convection preventing elements defining a plurality of closed air spaces are disposed between the covering means and the absorption surface. A high effective insulation is applied directly against all sides of the accumulator tank, with the exception of the absorption surface.

6 Claims, 4 Drawing Sheets

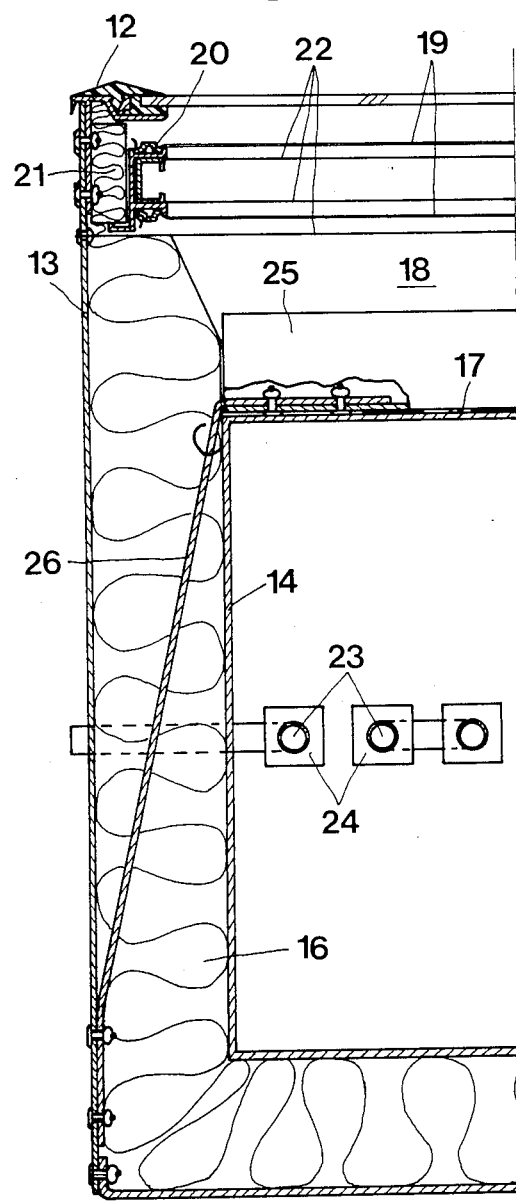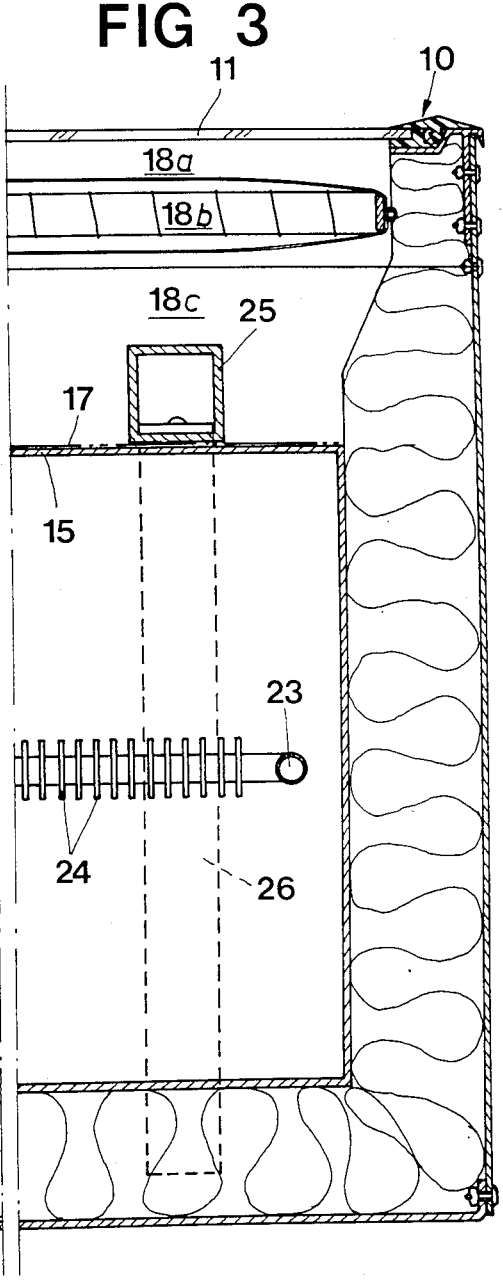

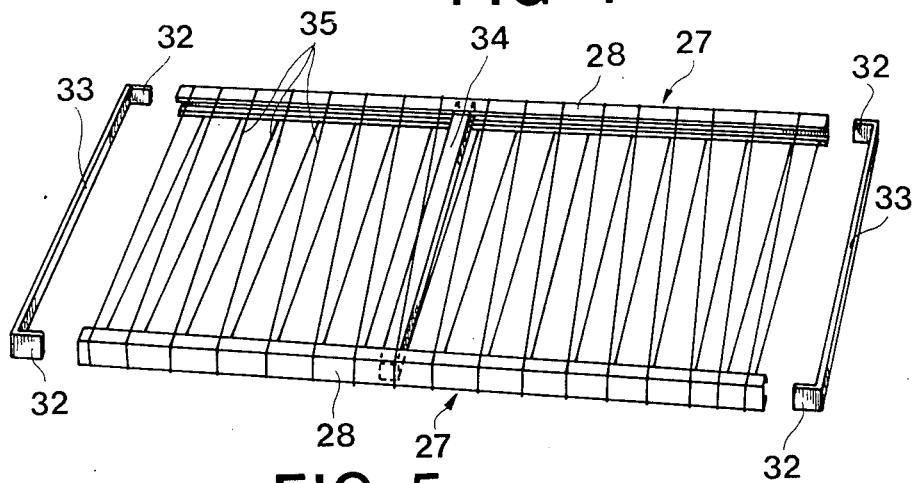
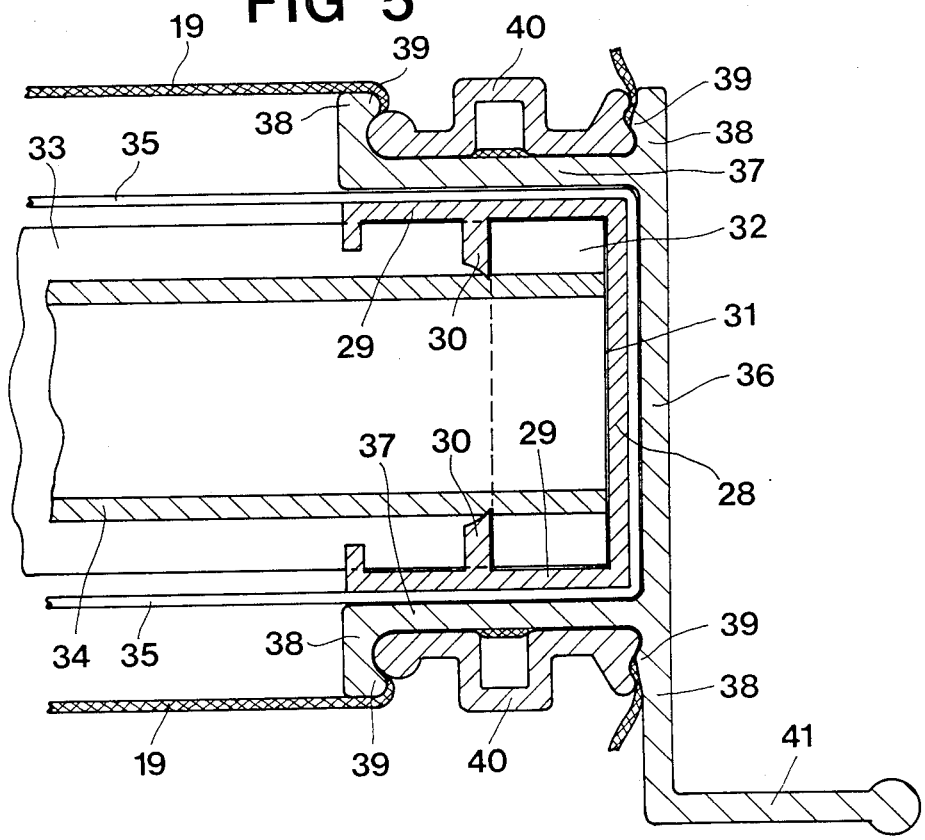

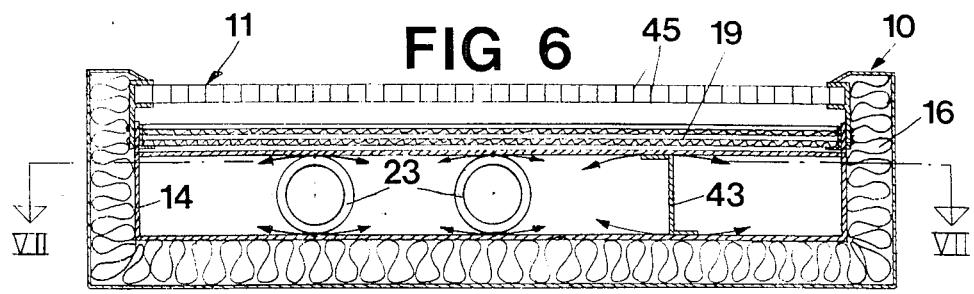
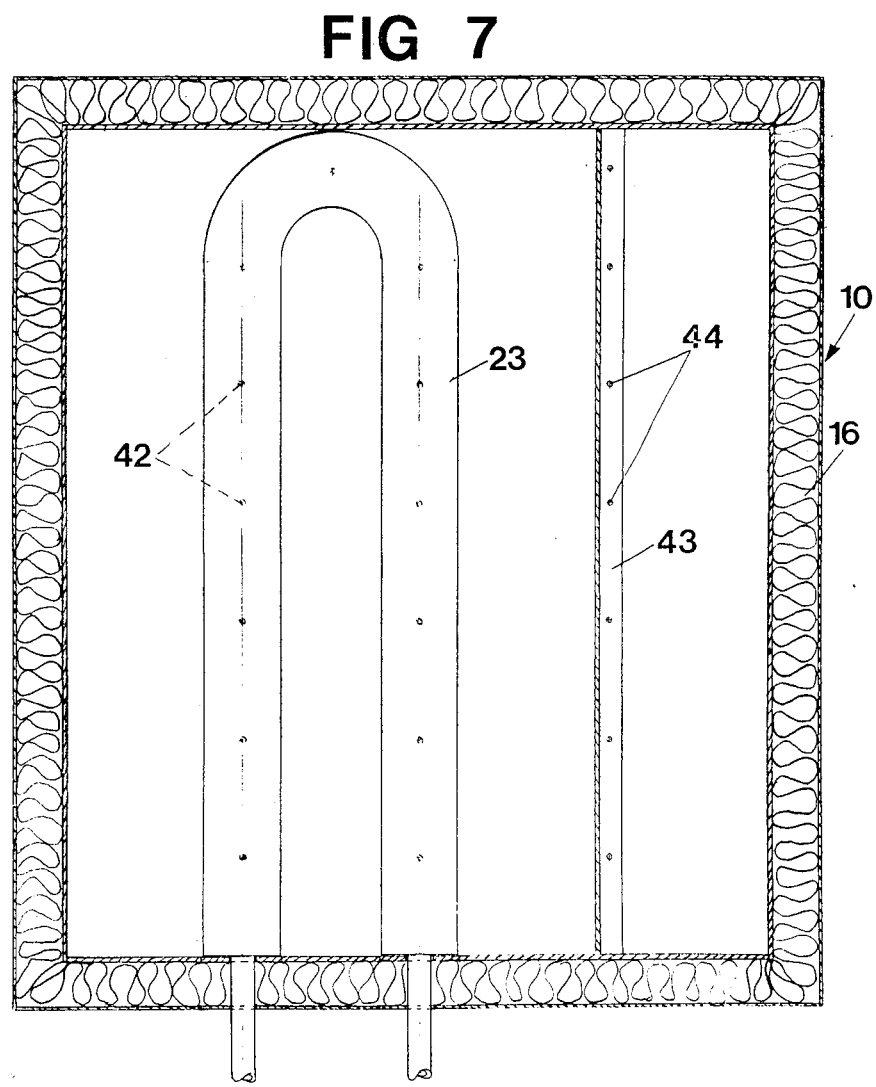

PLANE SOLAR HEAT COLLECTOR

This application is a continuation-in-part of application Ser. No. 817,861 field Dec. 10, 1985 and now abandoned.

The present invention relates to a solar accumulator with a plane solar heat collector, of the kind which emits radiated heat to an accumulator tank, containing a heating fluid in a pressure free condition, said collector comprising an external covering device for the incident radiation disposed at a selected distance from a radiation absorbent surface.

BACKGROUND OF THE INVENTION

Solar accumulators with a plane solar heat collector are used for utilizing direct solar radiation as well as diffuse sky radiation. Plane solar heat collectors comprise a radiation absorbent plate with ducts for heat carriers, which act as transmitted to the heating agent. The heat energy which is collected in this way in then used directly by a heat consumption unit, for example a hot water preparator for tap hot water, but it can also be conveyed to the vaporization system of a heat pump or the like. During the warm season of the ywar a substantial part of the collected heat can also be conveyed to one or several accumulators. Low temperature systems of the afore mentioned kind however demand accumulators with large volumes, which causes high investment costs and an increased space requirement. Besides an extensive pipe line system is required as the accumulator tank usually is placed within spaces such as a basement, outhouse or the like, which are located at a considerable distance from the solar collectors.

SUMMARY OF THE INVENTION

The object of the present invention is to provide a solar heat collector for a low temperature system with heat accumulation, which involves low investment costs, which requires relatively small spaces, which shows very little heat losses and which can be integrated with the building in a natural way. These problems have been solved by the fact that the absorbent surface comprises one wall of the accumulator tank and comprising a material having a good thermal conductivity, a plurality of closed air spaces being disposed between said transparent covering means and said absorption surface, said air spaces being defined by a plurality of convection preventing elements, the accumulator tank having a plurality of sides and directly against all said sides thereof, with the exception of the absorption surface, there is provided a high effective insulation.

DESCRIPTION OF THE DRAWINGS

FIG. 1 shows a section through a solar heat collector according to the invention mounted on an inclined foundation, roof frame or the like.

FIG. 2 and 3 are sections through a solar heat collector according to FIG. 1 in 90° rotation with respect to each other.

FIG. 4 shows in perpective the construction of a frame structure to a convection preventing member contained in the solar heat collector.

FIG. 5 shows a section through a frame structure of the convention preventing member on a larger scale.

FIG. 6 is a section through a modified embodiment of a solar heat collector according to the invention.

FIG. 7 is a section according to the line VII—VII in FIG. 6.

DESCRIPTION OF EMBODIMENTS

Figure 1:
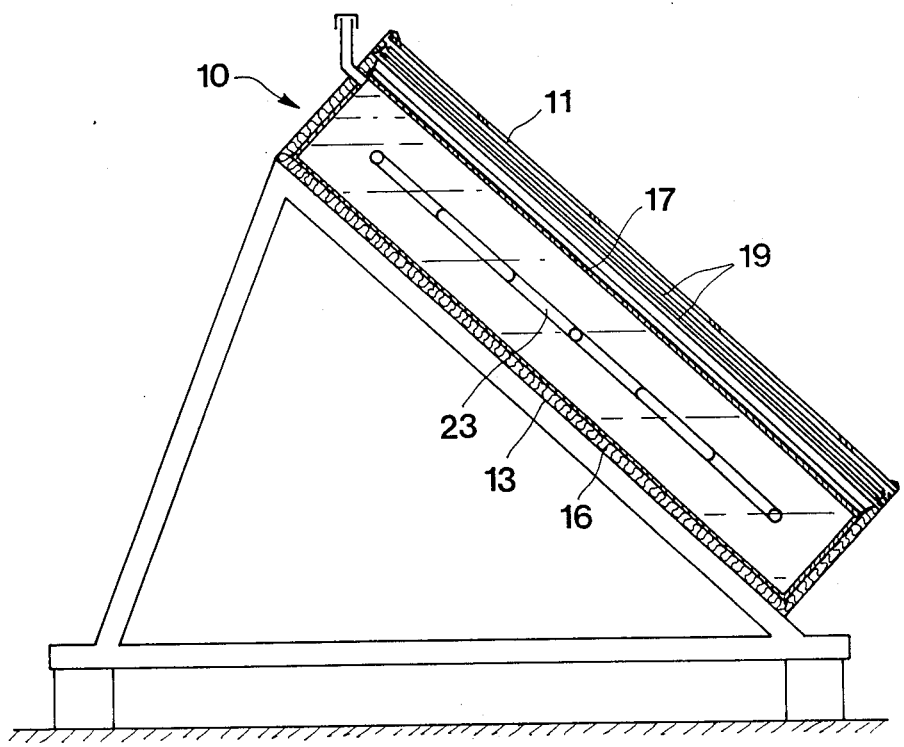

A solar heat collector according to the embodiment shown in FIGS. 1-3 consists of a box-shaped structure 10, where the side of the box facing the sun consists of a transparent covering means 11, for example a hardened glass plate. This is supported by a frame structure 12 in the form of extruded profiles, which is also supported by an external cover 13. Inside this there is arranged an accumulator tank 14, which on all sides with the exception of the side 15 facing the covering means 11 is provided with an insulation 16, which fills up the space between the cover 13 and the tank 14. The side wall of the tank 15 is at the side facing the covering means 11 provided with an absorbent surface 17, which can consist of a black foil glued against the side wall of the tank 15 and containing a thin nickel lining, but it can also be placed directly on the side wall surface in question, e.g. in the form of an anodization or the like.

In order to prevent losses of heat through the covering means 11, the closed air space 18 between the covering means 11 and the absorbent surface 17 is divided into further closed partial spaces 18a, 18b and 18c by means of convection preventing members 19 in the form of one or several thin plastic foils e.g. of polytetrafluoroethylene (e.g. Teflon) arranged under and parallel with the covering means 11. The plastic foils are tightened in a frame structure 27 on all sides, which will be described below, and which is arranged inside the cover 13 and insulation 21. In order to prevent contact between the plastic foils 19, when they expand because of the radiated heat, the frame structure also has the function of distancing the plastic foils from each other.

An important part in the construction of a solar heat collector, which is connected with an accumulator tank, is prevention of heat emission from the accmulator tank during the times when no heat energy is supplied to the solar collector through the covering means 11, e.g. at night. Arrangement of several covering glasses at some distance from each other deteriorates the radiation of solar heat and causes that the solar collector becomes more expensive and more heavy. A convection preventing member must besides not show any thermal bridges, which can considerably deteriorate the effect of the insulation. FIGS. 4 and 5 shown more in detail the construction of such a convection preventing member 19, which fulfills these demands, and which comprises a frame structure 27, which prevents contact between the plastic foils 19.

The frame structure 27 consists of an U-shaped profile bar 28, the side shanks 29 of which are provided with longitudinal inwards directed lips 30, which delimit an interior space 31. in which the bent end portions 32 of a flat rod are insertable from the ends and which form the short sides of the frame. The frame 27 is stiffened in the middle by a square pipe 34, which has such as external dimension that it can be clamped up between the end edges of the longitudinal lips 30. The frame structure is connected by means of a thin thread 35 which has been wound around the frame as is shown in FIG. 4.

On the outside of both opposed U-profile rods 28 are further passed a profile rod 36 each, which along two sides serve as holders for plastic foils 19. To this purpose the holder profile 36 is also partly U-shaped and is on the outside of the side shanks 37 of the U made with short sides flanges 38 provided with inwards directed beads 39 arranged for cooperation with a locking profile 40, with which the plastic foil 19 can be fixed to the holder profile 36. This is further provided with a leg 41, which in the mounted position of the convection preventing member 9 in the cover 13 rests against the insulation 16. The attachment of the plastic foils 19 along the short sides of the frame structure 27, i.e. along the plate bars 33, is made by folding the foils about the plate bars and are fastened together in an appropriate way.

Inside the accumulator tank 14 at least one heat exchanger coil 23 is arranged, preferably provided with cooling flanges 24, for a heat transport agent circulating through the coil.

The accumulator tank 14 is completely filled with a heating fluid, e.g. water with admixture of anti-freezer, which is not under pressure and which circulates only by thermosiphonic effect within the tank. In order to prevent that the free tank side wall which acts as an absorber surface bulges when the water expands through the heating, reinforced bars 25 can be arranged at a distance from each other on the external surface thereof in the air space 18 and which through struts 26 are connected with the cover 13 of the solar heat collector box 10. The external free surfaces of the struts 25 can also be active as absorbent surface, and may for this purpose be covered with the previous mentioned absorber foil or can also be prepared in an appropriate way, e.g. by anodizing. The side wall 15 of the accumulator tank 14 as well as the struts 25 consist of a material with good thermal conductivity. The entire accumulator tank 14 is preferably manufactured of stainless steel or aluminum. According to the invention there is obtained a constructively simple and cheap solar heat module, which in spite of its small dimensions, a depth of for example 30 cm and an area of 2.5 m², has a relatively large volume (0.7 m³).

According to a modified embodiment the struts 26 are eliminated and the tank 14 is made self-supporting, e.g. by means of one or more intermediate walls. In the partial space 18a transverse strut may be arranged.

According to the embodiment shown in FIGS. 6 and 7 the outer diameter of the heat exchanger coil 23 is almost equal to the depth of the accumulator tank 14 and the heat exchanger coil 23 is e.g. by a point welding 42 connected with the tank 14. In this way bulging of the tank 14 when the water expands through heating is prevented. The tank 14 is by the heat exchanger coil 23 and a profile strut 43 divided in compartments, but fluid communication to a certain degree is permitted between the compartments between the point weldings 42 and 44 of the heat exchanger coil 23 and the profile strut 43 respectively.

The convection preventing elements 19 in this embodiment comprise superposed corrugated or folded sheet or film material of transparent plastic with adjacent sheets having the corrugations extending in transverse directions with respect to each other.

The covering means 11 comprises transparent plate of e.g. acrylic plastic and consisting of double sheets spaced by a plurality of webs 45. Such a plate provides a good insulation and may also be used as a convection preventing element.

The invention is not limited to the shown embodiment, but a plurality of variants are possible within the scope of the claims. Other types of convection preventing means than the ones shown here may be used, e.g. folded Teflon ® R material or plates of silica aerogel.

I claim:

1. A solar accumulator with a plane solar heat collector of the kind that which emits radiated heat to an accumulator tank containing a heating fluid in pressure free condition, at least one heat exchanger coil being arranged in said accumulator tank, the outer diameter of the heat exchanger coil being substantially equal to the depth of the accumulator tank, so that the accumulator tank is divided into compartments by means of said heat exchanger coil, said collector comprising an external transparent covering means for the incident radiation disposed at a selected distance from a radiation absorbent surface, which comprises one wall of the accumulator tank and comprising a material having a good thermal conductivity, a plurality of air spaces being disposed between said transparent covering means and said absorbent surface, said air spaces being defined by a plurality of convection preventing elements, the accumulator tank having a plurality of sides and directly against all said sides thereof, with the exception of the absorbent surface, there is provided a highly effective insulation, said heat exchanger coil being connected at space location to oppositely located said sides of said accumulator tank whereby fluid communication is admitted between said compartments through passages formed between said spaced locations and between a respective side and said coil.

2. A solar accumulator according to claim 1, wherein said insulation is arranged to extend past the tank and along the sides of said air spaces up to and including the side edges of said transparent covering means.

3. A solar accumulator according to claim 1, wherein said convection preventing elements are mounted on a frame structure, which is provided with a distance member located between said elements.

4. A solar accumulator according to claim 3, wherein said distance member comprises a frame having opposed frame sides with a plurality of spaced threads extending between opposed said frame sides.

5. A solar accumulator according to claim 1, wherein said convection preventing elements comprise superposed folded or corrugated film- or sheet material.

6. A solar accumulator according to claim 1, wherein said convection preventing elements comprise at least double transparent sheets spaced by a plurality of webs.

* * * * *